United States Patent [19]

Umei

[11] Patent Number: 5,795,048
[45] Date of Patent: Aug. 18, 1998

[54] OVER HEAD PROJECTOR APPARATUS AND CONTROL METHOD

[75] Inventor: Sachio Umei, Tokyo, Japan

[73] Assignee: Samsung Aerospace Industries, Ltd., Kyeongsangnam-do, Rep. of Korea

[21] Appl. No.: 598,957

[22] Filed: Feb. 9, 1996

[30] Foreign Application Priority Data

Feb. 17, 1995 [JP] Japan .................................. 7-029003

[51] Int. Cl.$^6$ .................................................. G03B 21/14
[52] U.S. Cl. ........................ 353/122; 353/25; 345/118
[58] Field of Search ...................... 353/25, 122; 345/118, 345/121, 123, 124, 125, 127–130, 901

[56] References Cited

U.S. PATENT DOCUMENTS

| | | | |
|---|---|---|---|
| 4,428,065 | 1/1984 | Dorall et al. | 345/130 |
| 5,475,399 | 12/1995 | Borsuk | 345/130 |
| 5,596,346 | 1/1997 | Leone et al. | 345/121 |
| 5,659,333 | 8/1997 | Okishima | 345/123 |

OTHER PUBLICATIONS

Optronics Optical Technique Dictionary, p. 27, Optronics Corporation, Jan. 18, 1994.

*Primary Examiner*—William Dowling
*Attorney, Agent, or Firm*—Finnegan, Henderson, Farabow, Garrett & Dunner, L.L.P.

[57] ABSTRACT

An over head projector including an image inputting device for inputting an image data of a manuscript; a projecting optical system for projecting the image data onto a screen by a first magnification; and an image data magnifying device for dividing a plurality of character image data from the image data of the manuscript into one or more groups of character image data which each group fits a displaying area having a predetermined size, to magnify the character image data by a second magnification, and for transmitting the magnified character image data by each group of character image data onto the projecting optical system.

7 Claims, 7 Drawing Sheets

Displaying Range in OHP    Moving to Next Row

FIG.9
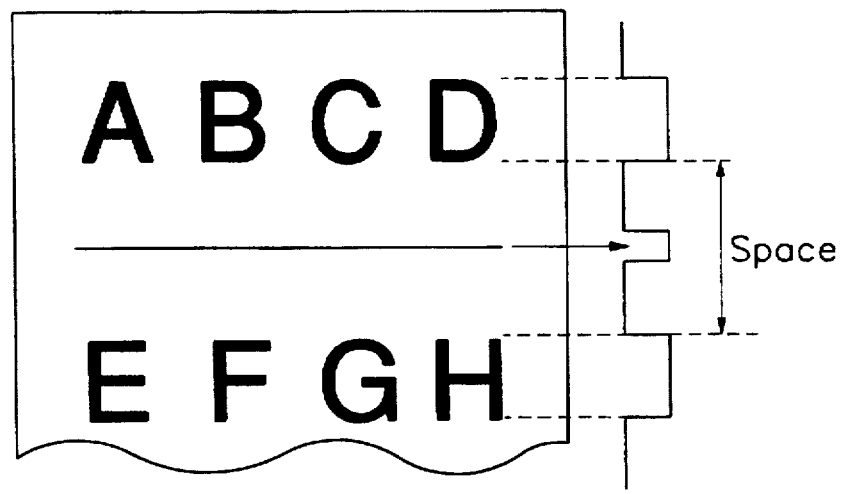
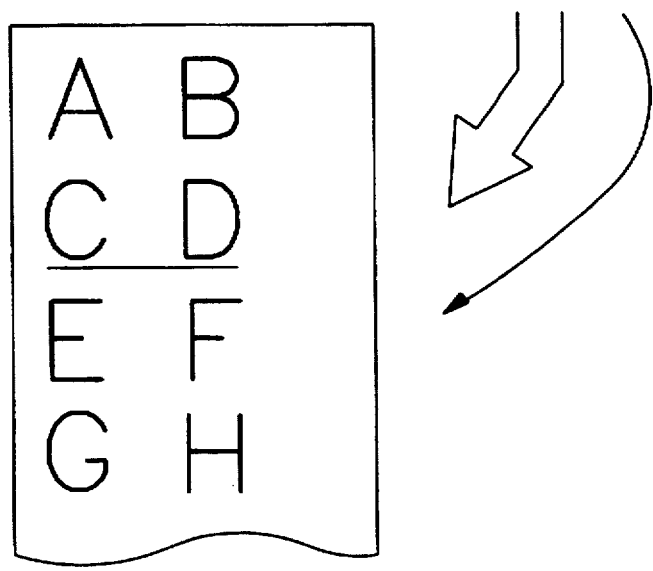

OVER HEAD PROJECTOR APPARATUS AND CONTROL METHOD

BACKGROUND OF THE INVENTION

1. Field of the Invention

The present invention relates to an over head projector apparatus and control method, and more particularly, to an over head projector apparatus and control method for enhancing data display function for manuscripts including characters.

2. Description of Related Art

In this specification, the acronym "OHP" is used for "over head projector" and the acronym "CCD" is used for "charge coupled device." OHP has been widely used in meetings intended for a large audience, for example, commodity presentation parties, academic meetings, and conferences, in order to present manuscripts to many people. OHP optically reads image data from a manuscript generally having a paper size prepared by a lecturer, and magnifies the image data which is read by an electronic optical means, such as a CCD camera, to project the read image data on a screen or a wall where it becomes visible.

OHP technology is described in 'Optronics Optical Technique Dictionary' on page 27, published by Optronics Corporation, Jan. 18, 1994.

A conventional OHP magnifies the entire manuscript using an optical method, and then displays the entire manuscript. Accordingly, prior OHP's have a relatively low magnification, and makes contents of a manuscript in a magnified screen illegible. To overcome this defect, when using a CCD camera for example, a method for easily recognizing character information by increasing display magnification has been studied. According to the method, a part of an image data is designated in the manuscript and the corresponding area is then selectively transmitted to a projecting optical system. Optical method enhances character recognizability if partial image can be transmitted within a screen merely by increasing magnification.

However, by magnifying only a part of a manuscript, the scroll of a manuscript in any direction causes a portion of a sentence, written either vertically or horizontally, to be cut off from display. Accordingly, although characters can be recognized, the meaning of words in the manuscript cannot be obtained from the context.

To avoid problems in the prior art, a writer needs to magnify the character size of a manuscript before writing by maximum magnification within the size of an OHP screen display, which makes writing the manuscript extremely complicated.

SUMMARY OF THE INVENTION

Accordingly, the present invention is directed to an OHP apparatus and control method that substantially obviates one or more of the problems due to limitations and disadvantages of the related art.

The present invention provides an OHP apparatus and control method that are capable of magnifying characters in a manuscript with legible magnification, without disturbing the viewers' ability to understand the message from the manuscript.

The present invention also provides an OHP apparatus and control method that are used for displaying a three-dimensional object as well as a two-dimensional manuscript onto a screen.

Furthermore, the present invention provides an OHP and a control method that are capable of magnifying characters in a manuscript with legible magnification, without restrictions in writing the manuscript, and disturbing the ability to understand the messages of the manuscript.

The present invention also provides an OHP apparatus and control method that can use various input sources as an input for a manuscript, making it convenient for the user.

The present invention, as embodied and broadly defined herein, includes an over head projector comprising an image inputting means for inputting an image data of a manuscript; a projecting optical system for projecting the image data onto a screen by a first magnification; and image data magnifying means for dividing a plurality of character image data from the image data of the manuscript into one or more groups of character image data, each group fitting an displaying area having a predetermined size, to magnify the character image data by a second magnification, and for transmitting the magnified character image data by each group of character image data onto the projecting optical system.

Another aspect of the invention includes a method for controlling an over projector comprising the steps of dividing a plurality of character image data representing an image data of a manuscript into one or more groups of character image data, each group fitting a displaying area having a predetermined size, to magnify the character image data by a second magnification and displaying the magnified character image data by each group of character image data.

Furthermore, since the invention processes the image of the manuscript, we can easily read each magnified character without restricting the writing of manuscript as well as damaging the meaning of the manuscript.

Moreover, the present invention can use not only a hard copy of the manuscript, but also a data file recorded by a word processor or a personal computer as an input information source, thereby improving the utilization of the OHP.

In case that a CCD camera is used as image inputting means, the present invention can display three-dimensional objects as well as two-dimensional manuscripts on a screen to serve the convenience to serve the convenience of a user.

The above-mentioned objects and other objects of the present invention will become apparent from the following detailed description when viewed in light of the accompanying drawings.

BRIEF DESCRIPTION OF THE DRAWINGS

FIG. 9 illustrates the inclusion of a division line in rows folded in accordance with the present invention.

DETAILED DESCRIPTION OF THE PREFERRED EMBODIMENTS

Figure 1:
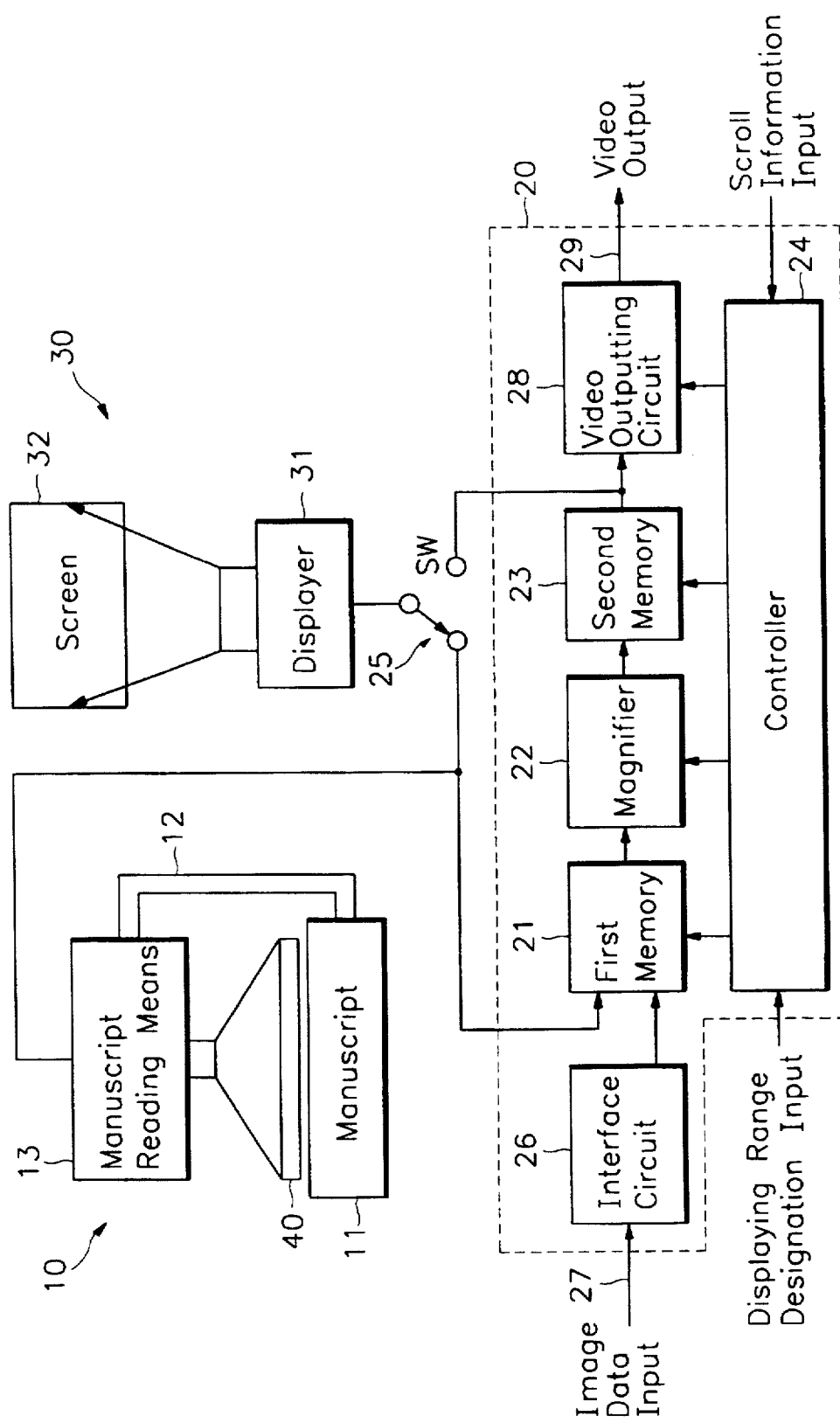
FIG. 1 is a block diagram of an OHP configuration in accordance with a preferred embodiment of the present invention.

Referring to FIG. 1, an OHP in accordance with a preferred embodiment of the present invention is comprised of manuscript reading means 10, image processing means 20, and displaying means 30.

The manuscript reading means 10 includes a manuscript stand 11; a manuscript reader 13 such as a CCD camera; and a support 12 which is interposed between the manuscript stand 11 and a manuscript reader 13. The manuscript reader 13 reads through an image of a manuscript which is laid on the manuscript stand 11.

When using the CCD camera as the manuscript reader 13, the manuscript reading means 10 is capable of displaying onto a screen a three-dimensional object laid on the manuscript stand 11, as well as a two-dimensional object such as a manuscript.

The displaying means 30 includes a displayer 31 for controlling a shutter, such as liquid crystal, according to an image data signal; a magnifying optical system for magnifying an image which is transmitted by the shutter with a predetermined pattern, according to a predetermined magnification (not shown); and a screen 32 where the magnified image is projected. The liquid crystal controls whether a light is transmitted from a light source or not, with a predetermined resolution for each pixel.

The image processing means 20 includes a first memory 21 for controlling an image signal inputted from the manuscript reader 13 as a bit map; a magnifier 22 for processing the image data stored in the first memory 21; a second memory 23 for storing the result from the magnifier 22; and a controller 24 for controlling the result from the second memory 23. The second memory 23 includes a plurality of frames which can store the magnified image in multiple sheets, and successively scrolls multiple frames in a vertical direction. It is preferred in the present invention that the number of multiple frames is four. In addition, in case the second memory 23 has only one frame, the data of the previously displayed line scrolls off the screen.

The output of both the second memory 23 and the output of the manuscript reader 13 is inputted to the displayer 31 of the displaying means 30 through a switch 25. And, according to the operation of the switch 25, the output of the manuscript reader 13 is displayed with magnification by the displayer 31 without any variation, or is displayed with magnification by the displayer 31 by selecting the output as the magnified image data produced from the second memory 23. In addition, the output of the manuscript reader 13 can be displayed with large magnification, multiplying the magnification with the magnifier 22 while scrolling a portion of a manuscript 40.

The controller 24 can input controlling information, such as designation of a displaying range, and turn-ON/OFF of a scroll and speed of a scroll, through inputting means mounted to the manuscript stand 11, such as a keyboard (not shown).

The first memory 21 can receive an image data 27 outputted from information processing devices, for example, word processor or personal computer, through an interface circuit 26. The second memory 23 connected to a video outputting circuit 28 can provide video output 29 to a desired video display apparatus.

A circuit board containing the image processing means 20 is mounted to the inside of the manuscript stand 11 for compact structure.

An example of the operation of the OHP according to the preferred embodiment of the present invention will be described hereinafter.

Figure 2:
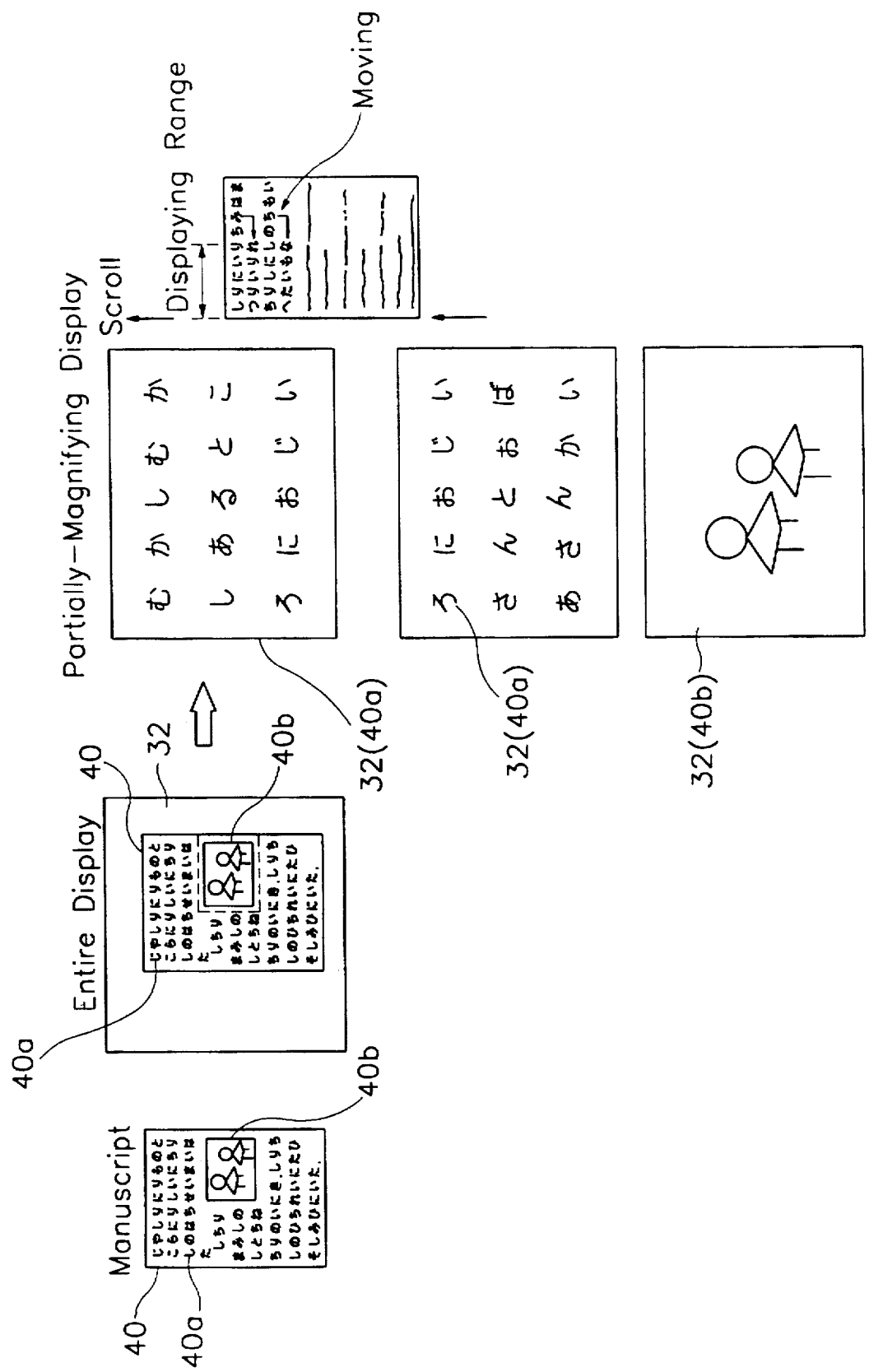
FIG. 2 shows magnification of a manuscript in accordance with the present invention.

A manuscript 40 laid on a manuscript stand 11 is read through by a manuscript reader 13, and when the switch 25 is connected to the displayer 31, the read image data is inputted directly to a displayer 31 to project the entire manuscript 40 onto a screen 32 with a predetermined magnification (shown on left side of FIG. 2). However, if the switch 25 is connected to the second memory 23, through an image processing by the first memory 21, the magnifier 22, and the second memory 23, the magnified portion of the manuscript 40 is inputted to the displayer 31, projected onto a screen 32, and then displayed as a scroll (shown on right side of FIG. 2). That is, using the image data of the first memory 21, the magnifier 22 examines the space between lines of character data and separates the characters from each other, simultaneously magnifying the character image according to the predetermined displaying range. The magnifier 22 reduces the length of a row by doubling over or folding several character images of one row into separate rows, and outputs them into a corresponding displaying range of the second memory 23.

For example, as shown in FIG. 2, where the manuscript 40 contains both a character field 40a and an image field 40b, the magnifier 22 cuts out (or separates) the image from the character field 40a per character unit within each row as well as per row unit, and in case of a partial manuscript magnifying display, magnifier 22 displays each row after folding each row to include the character within the row into a displaying range, and then successively scrolls them. In the above-mentioned operation, magnified display of partial manuscript allow continuous display of each character within each row, like a meaningful general document, where each character is legibly magnified with no cutting off in the midst of a row. Since the characters meaningfully related to one another successively appear in the displaying range, without being cut off, viewers can comprehend the meaning of the manuscript from the screen display. And, the image field 40b of the manuscript 40 can be selectively displayed if necessary.

An adjustment by the magnifier 22 is fully explained in the following description.

Figure 3:
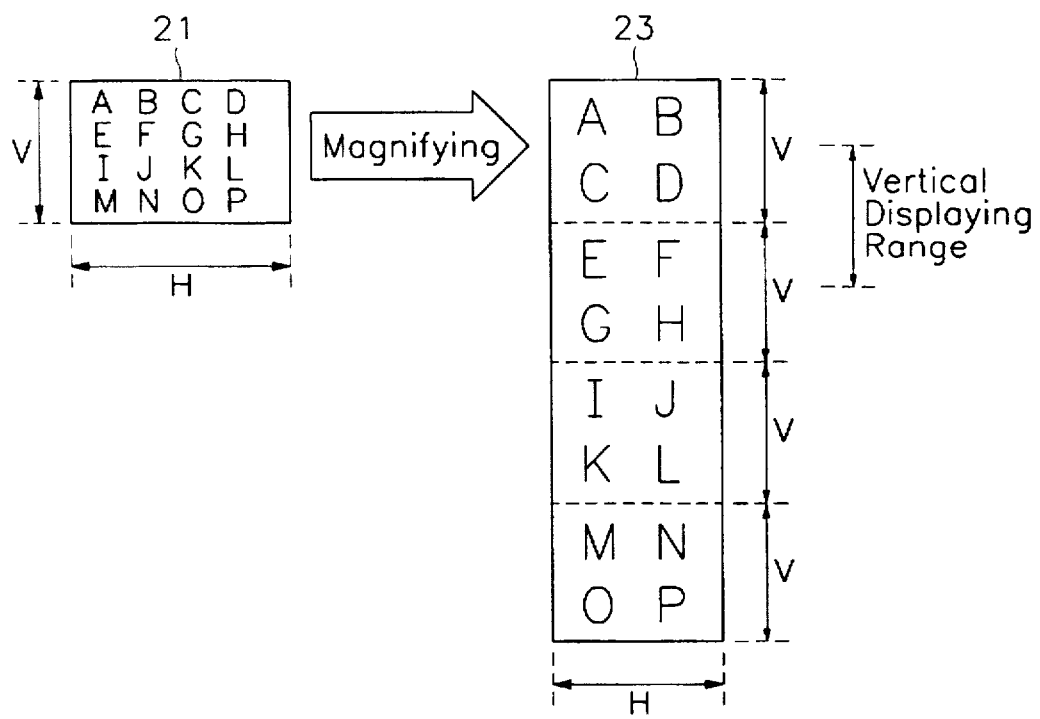
FIG. 3 shows an arrangement of characters in a magnified display in accordance with the present invention.

As shown in FIG. 3, "ABCD", "EFGH", "IJKL", AND "MNOP" are written in the manuscript 40 in four-rows. If these characters are magnified double in width and double in length to a displaying range (width of two characters X height of two rows) of the manuscript, each row is magnified as divided at the end of the second character, stored in the second memory 23, and the magnified image data of the second memory 23 is automatically scrolled in a vertical direction. Accordingly, all characters of the manuscript 40 can be magnified to be legible, and are displayed without disturbing the context or meaning of the manuscript and without eliminating characters.

In the above-mentioned operations, the image data received by the first memory 21 should be separated by rows and by character image within a row, as explained in the following description of a preferred embodiment of the present invention.

Figure 4:
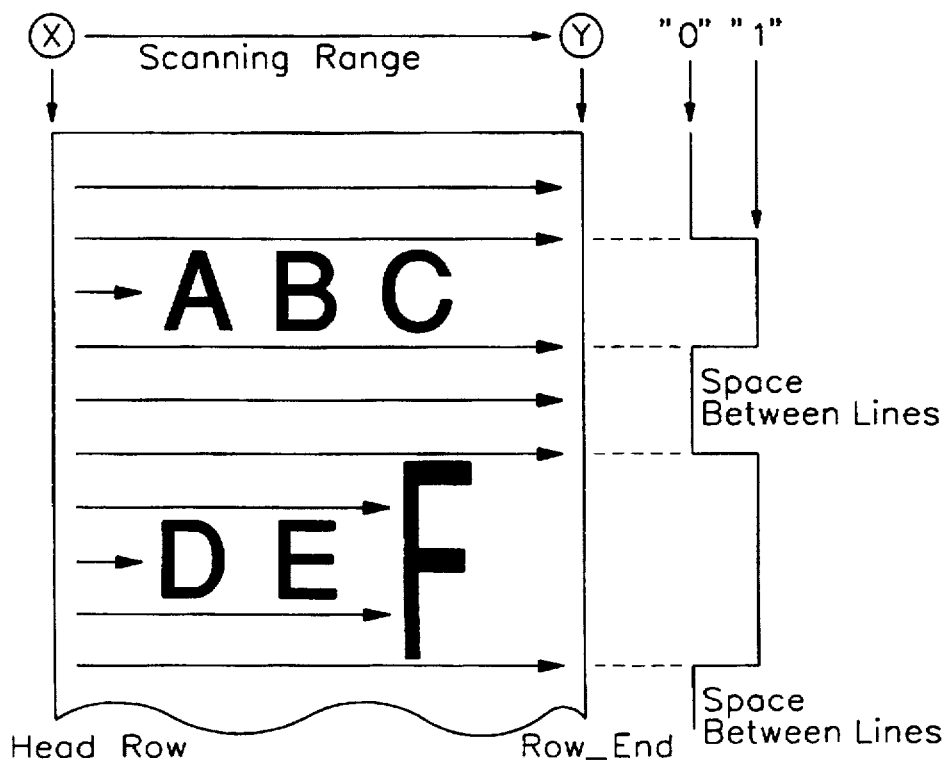
FIG. 4 shows the image data of a manuscript as a bit map.

As shown in FIG. 4, in case the image data are received by the first memory 21, in which the bit map of black image data is 1 and a bit map of white image data is 0 a preferred embodiment of the present invention searches for a space (that is, 0) between lines by scanning the image data of the first memory 21 vertically, thereby recognizing each row.

That is, if 1 does not appear while scanning from a head row X to row-end Y of FIG. 4 (that is, only 0 appears), the image is determined as a space between lines. Otherwise, the image data is located between lines.

Therefore, the height of each character with the height between lines are calculated by an equation which is height of one character + (distance between lines/2). According to this calculated value, the scanning sequence moves successively, thereby recognizing each row.

According to a row unit, a plurality of characters in each row are separated one by one, and the number of displayed characters (that is, a width of the displaying range) is determined. However, to confirm the height of a character, several rows of image data are examined. In case of a character like a "川" having vertical spaces within a character, it avoids wrongfully recognizing the character width smaller than the actual width.

Figure 5:
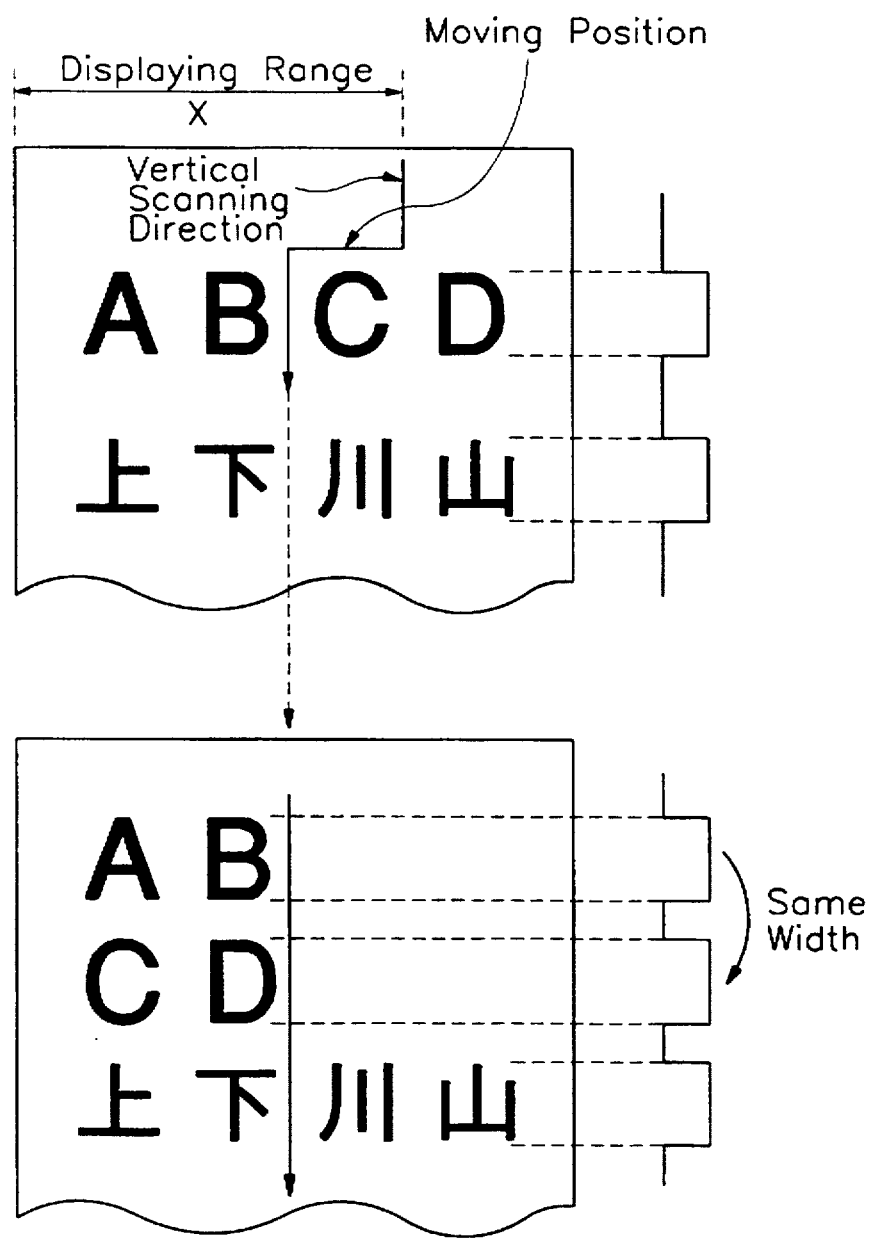
FIG. 5 illustrates separation of character strings into different rows.

An example shown in FIG. 5 separates both each row and characters within a row as described above, and the character of the head row is determined as a previous character if the character is located within the boundary line of a displaying range X, i.e., character string AB. On the other hand, character string "CD" located in the row-end separated by the displaying range X is moved to the next head row.

If the character string of the row-end remains separated by the displaying range, the character string is repeatedly separated and divided in increments of width of the displaying range X. If the displaying range X is larger than half the row length, since the length of row-end is not checked, all characters separated from the displaying range X are moved to the next row unconditionally. In the example of FIG. 5, the character string "川 ム" of the entire character string "上下 川, ム" in one row is moved to the next row without incorrect recognition.

Figure 6:
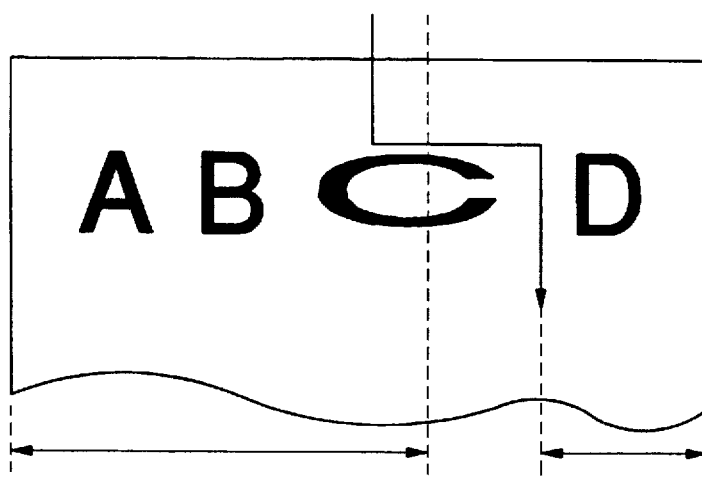
FIG. 6 shows division of characters of different sizes.

Moreover, as shown in FIG. 6, if it is difficult to recognize the space between characters because the width of characters is not uniform, i.e., "C" is larger than that of A, B, and D, the larger character is cut by using an estimated value determined by the width of other characters. In a preferred embodiment of the present invention, since a sentence is continuously displayed within the displaying range and only one character is located in the boundary position, we can predict the content of the sentence from the relationship between the first and last characters in the sentence.

Figure 7:
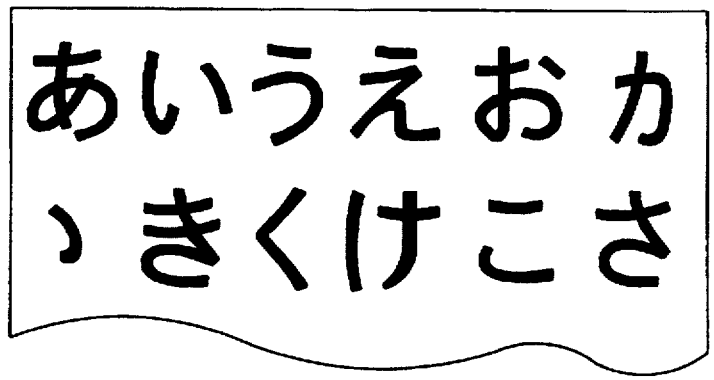
FIG. 7 shows a single character separated into different rows.

For example, as shown in FIG. 7, although a dot marked in the right top portion of the character "ぢ" is separated from a body and is moved to the next row, we can understand the meaning of the sentence by the relationship of the first to last characters.

Figure 8:
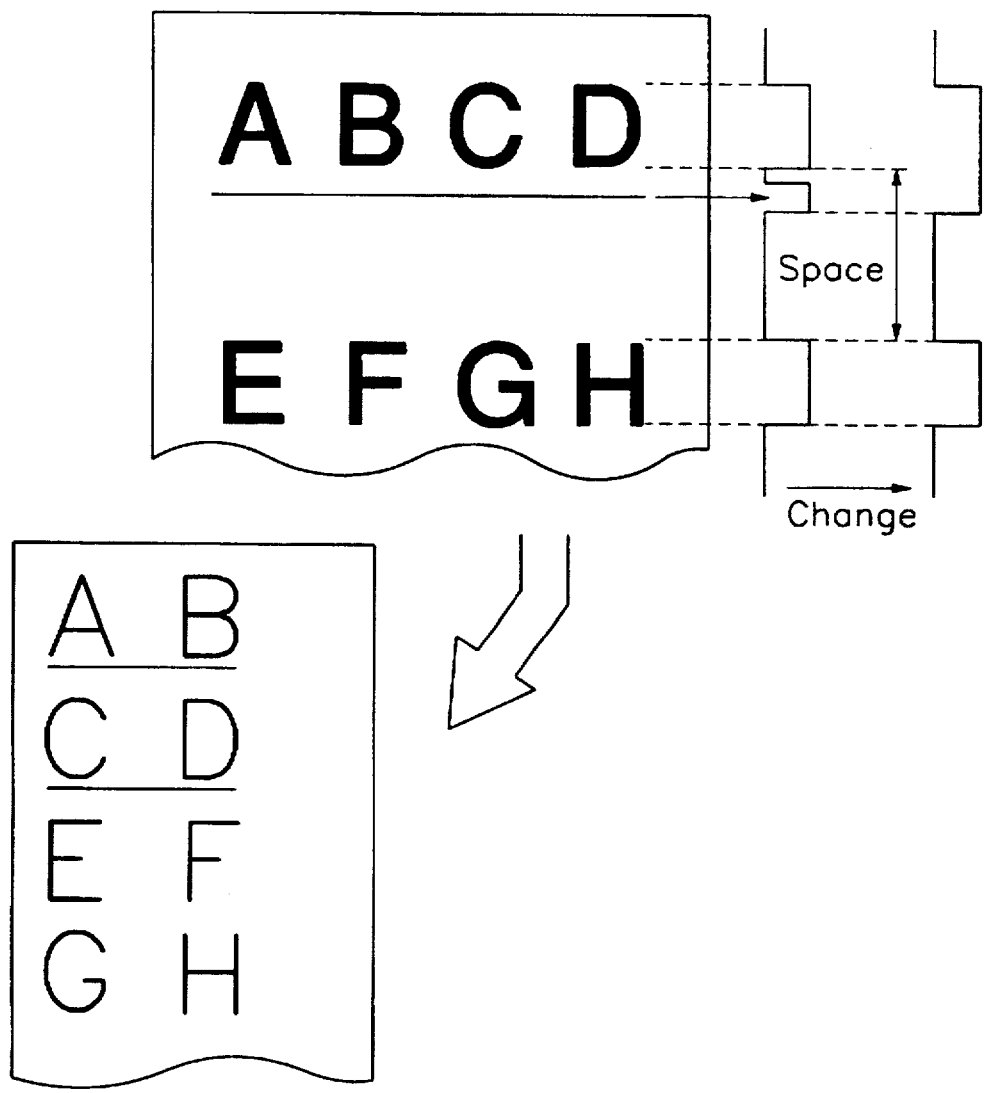
FIG. 8 illustrates the inclusion of an underline in rows folded in accordance with the present invention.

In addition, as shown in FIG. 8, in case an underline is drawn horizontally, the row is recognized as a line because of a narrow vertical width. Also, since the distance from the row of a corresponding line is smaller than the distance between lines divided by two, the line can be recognized as an underline. The line is separated during the space check between lines and is moved to the next row together with corresponding characters, and displayed as underline without any distortion.

Next, as shown in FIG. 9, in case a line is located in the middle of two rows, at which point the distance equals the space between rows divided by two, the line is determined as a dividing line, and the dividing line is placed between the character string "CD", which is moved to another row, and the head string "EP" of the next row. Accordingly, a meaning of the sentence in a corresponding line is maintained.

Although the above instance is a case magnifying a signal output from a manuscript reader 13, the above-mentioned can also be applied to the image data 27 from a word processor or a personal computer. In this case, for example, if the image data 27 is composed of character codes, this invention converts the image data to bit map data by means of the interface circuit 26, and records them to the first memory 21. Accordingly, the same processing as the above-mentioned can be applied to either a word processor or a personal computer. In addition, if the image data 27 is composed of the bit map data, image data may be recorded in the first memory 21 without any variation or magnification.

According to the present invention OHP apparatus and control method, a portion of a manuscript, i.e. a sentence, is displayed horizontally within a magnifying range without cutting off in the midst of a row. Accordingly, the present invention can legibly magnify a sentence by using large magnification without disturbing the meaning or context of the manuscript.

For example, where a CCD camera is used as a manuscript reader 13, the present invention can be used for not only a three-dimensional object display according to a feature of the CCD camera, but also a character manuscript display having small characters.

Additionally, there is no need for magnifying the character size when writing a manuscript, thus enhancing the utility of the OHP by minimizing restrictions in manuscript writing.

What is claimed is:

1. An over head projector, comprising:

image inputting means for inputting an image data of a manuscript;

a projecting optical system for projecting said image data to a screen at a first magnification; and image data magnifying means for dividing said image data of the manuscript into groups of character image data, each fitting into a display area having a predetermined size, for magnifying said character image data by a second magnification, and for transmitting said magnified character image data by said groups of character image data to said projecting optical system.

2. The over head projector of claim 1, wherein said image data magnifying means comprises:

a first memory for storing said image data of a manuscript received from said image inputting means;

a magnifier for dividing said image data stored in said first memory into said character image data by each row and each character;

a second memory for storing the divided character image data; and a controller for controlling said magnifier, said first memory and said second memory.

3. The over head projector of claim 1, wherein said projector optical system includes means for sequentially scrolling said character image data on a screen.

4. The over head projector of claim 2, wherein said image inputting means comprises:

a manuscript reader for reading the manuscript and storing an image of the manuscript in the first memory; and a predetermined information processing unit connected to the first memory through an interface circuit, for storing in the first memory received image data or a character-code-data received from an external device.

5. The over head projector of claim 2, futher comprising a video outputting circuit coupled to the second memory for selectively outputting said image data to the projecting optical system and a video output device.

6. A method for controlling an over head projector, comprising the steps of:

receiving image data of a manuscript from a manuscript reader;

dividing the manuscript image data into groups of character image data, each group fitting into a display area having a predetermined size;

magnifying said character image data by a first magnification; and displaying said magnified character image data by said groups of character image data.

7. The method of controlling an over head projector of claim 6, wherein said displaying step includes sequentially scrolling said character image data.

* * * * *